No. 630,489. Patented Aug. 8, 1899.
M. DÉRI.
ALTERNATING CURRENT MOTOR.
(Application filed Jan. 12, 1898.)

(No Model.)

WITNESSES:
F.W. Wright.
J. C. Connor

INVENTOR
MAX DÉRI
BY
Howson and Howson
HIS ATTORNEYS.

UNITED STATES PATENT OFFICE.

MAX DÉRI, OF VIENNA, AUSTRIA-HUNGARY.

ALTERNATING-CURRENT MOTOR.

SPECIFICATION forming part of Letters Patent No. 630,489, dated August 8, 1899.

Application filed January 12, 1898. Serial No. 666,415. (No model.)

*To all whom it may concern:*

Be it known that I, MAX DÉRI, a subject of the Emperor of Austria-Hungary, residing at Vienna, in the Province of Lower Austria, in the Empire of Austria-Hungary, have invented certain new and useful Improvements in Alternate-Current Motors; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

It is generally useful to place starting-resistances into the circuit of the induced windings of electromotors for monophase or polyphase alternating current. By this means the starting-torque will be increased. The general practice for this purpose is to provide collector-rings on the armature and by means of brushes to insert the resistances in the armature-coils. The resistances are to be cut out of circuit as soon as the motor has reached a certain speed. This method implies several complications in the construction of the armature and diminishes its efficacy. Another way of accomplishing a similar object, especially with monophase-motors, is the use of a commutator in connection with the armature-coils in order to obtain by shifting and interconnecting the brushes a considerable starting-torque. The induced currents need to pass through commutator and brushes only during the starting period, and the motor after having reached a certain speed will work only by the induction of the closed armature-windings, so that commutator and brushes then are of no use. By the following new devices the resistances and commutators are so arranged in a very simple way in connection with the armature that they may be put into or out of action without special external leads being connected to the armature-wires and without special switching-gears being actuated in the armature-circuits.

Figure 1A:
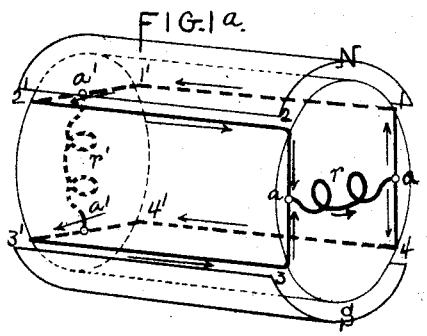
Figure 1B:
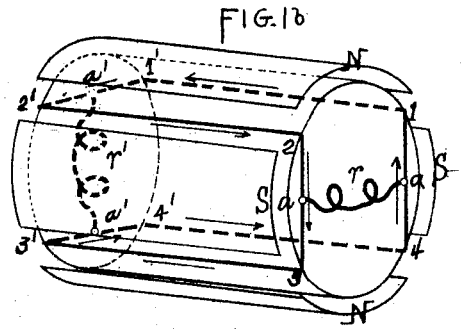
Figure 2A:
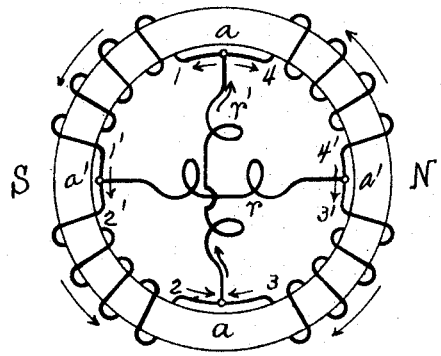
Figure 2B:
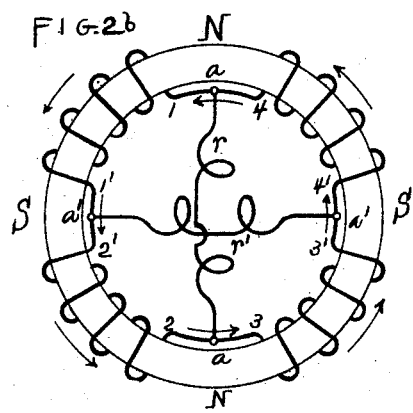
Figure 3:
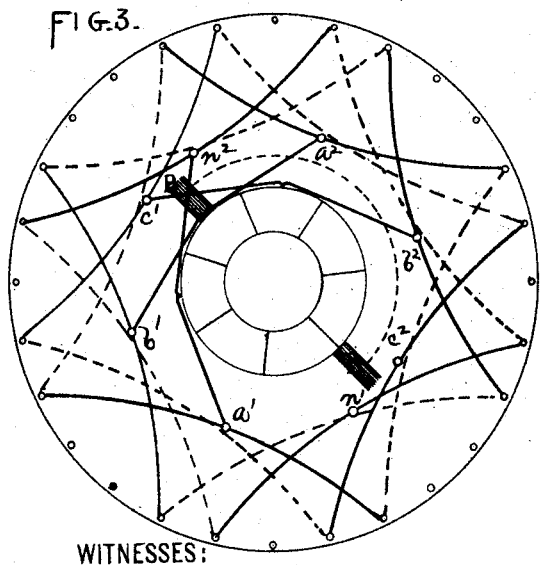
Figure 4:
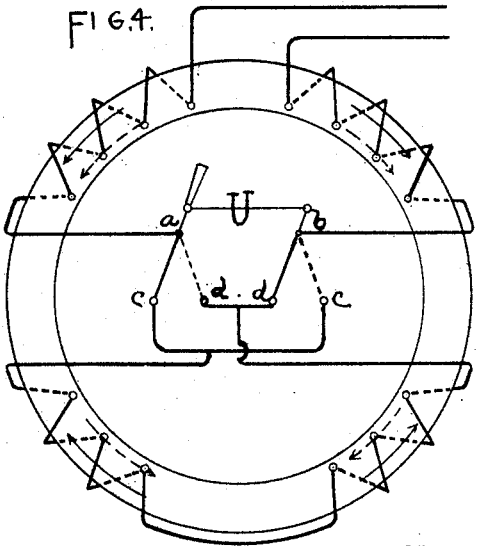

Figure 1 represents a set of windings, and Fig. 2 a set of coils, which are placed on the armature and connected in such a way that in a four-pole alternating field, Figs. 1$^b$ and 2$^b$, they carry the induced currents in series forming a closed circuit. In a two-pole field, Figs. 1$^a$ and 2$^a$, however, they are without current, the sum of electromotive forces induced in all the windings or coils of the set being zero in every position. In a four-pole field the current flows in the order 1 1, 2, 2 3 3, 4, 4 1, and no difference of potential will occur between the connecting points $a$ and $a$ nor $a'$ and $a'$. In a two-pole field, however, a difference of potential will appear between these points. Therefore leads connecting the points $a$ and $a$ or $a'$ and $a'$ will be without current in a four-pole field and currents will pass through them in a two-pole field. By providing such four-pole closed windings or coils on the armature and by connecting the points $a'$ $a'$ by means of suitable resistances $r'$ $r'$, the latter forming coherent parts of the armature-windings, the object is obtained that in a two-pole field the resistances will help to increase the starting-torque; but after a suitable speed is reached the field will be changed to a four-pole one and the resistances thereby get out of action. Fig. 3 shows a diagram of connections between the armature-windings of a monophase-motor and a commutator according to this method, the object being to produce by shifting and connecting the brushes a considerable starting moment. In this case the connecting-points of the windings or coils are not to be directly joined as above in order to form individual closed circuits, but similar to the winding of a drum-armature in an ordinary dynamo the points $a^2$ $b'$ $b^2$ $c'$ $n^2$ $a'$ are connected together with the commutator-bars. It is useful even in this arrangement to give a suitable resistance to the connections between the points $a\ b\ c\ n$ and the commutator-bars. By this means, besides obtaining the principal object of increasing the starting-torque, we will also avoid the sparking of the brushes. If such an armature is exposed to a two-pole alternating field, differences of potential will take place between the points $a'$ $a^2$ $b'$ $b^2$. Induced currents pass through the connecting-wires $a^2$ $b'$ $b^2$ $c'$ $n^2$ $a'$ and through the brushes and generate a starting-torque. After the proper speed is reached the field will be changed into a four-pole one. The induced currents flow in the closed windings and coils and cause the armature to be kept rotating. Then no difference of potential exists between the points $a'$ $a^2$ $b'$ $b^2$, and therefore no current passes through the connecting-wires $a^2$ $b'$ $b^2$ $c'$ $n^2$ $a'$ to the commutator and the brushes. The armature-wires can be used to better advantage in a two-pole field if resistances or commutators are inserted at both front faces of the armature in connection with all the proper points of the windings. In order to make the motor-field in all these cases now two-pole and then four-pole, the field-coils are to be arranged in combination with a switch U, as represented in Fig. 4. The arrows in this diagram are to indicate the direction of the magnetic flux. By respective position of the switching-gear either $a$ is connected with $d$ and $b$ with $c$, whereby a two-pole field is produced, or $a$ is connected with $c$ and $b$ with $d$, resulting in a four-pole field. This diagram refers to a monophase-motor; but it is easily seen that the arrangement by multiple switches may be applied in an analogous way to polyphase fields. The switching is done by hand or automatically.

In the example described and shown there are two poles and four poles; but it is obvious that other numbers of poles can be used. In case an even number of poles be chosen for one mode of working, an even, but a different, number is chosen for the other mode of working. It is preferable in each case to have one number a multiple of the other. It is also preferable to use the smaller number of poles for starting the motor and the larger number for the normal working.

I claim as my invention—

1. In alternate-current motors, the combination of sets of windings or coils in the armature with resistance connections which are inserted between the junctions of the windings or coils in such a manner that in an alternating field with a certain number of poles the induced currents pass through the said connections but in an alternating field, the number of poles of which is different from above, these connections have no current, and switching devices arranged in connection with the field-coils for producing in the motor fields having a different number of poles with different positions of the switching devices, substantially as described.

2. In monophase alternate-current motors, the combination of sets of windings or coils on the armature with a commutator, the bars of which are connected with the junction-points of the windings or coils in such a manner that in an alternating field with a certain number of poles the induced currents pass through the commutator and brushes, generating a starting-torque, but in an alternating field the number of poles of which is different from the above, the commutator and the brushes are without current and switching devices arranged in connection with the field-coils for producing in the motor fields having a different number of poles with different positions of the switching devices, substantially as described.

3. The mode herein described of operating an alternate-current motor having armature-coils with resistances connected between certain points of the same, consisting in producing in the field-magnets a given number of poles and passing the induced currents through the armature coils and resistances, and thereby increasing the starting-torque, and then for the normal working producing in the same field-magnets a different number of poles, and preventing thereby any difference of potential from arising in the said resistance connections of the armature-coils, substantially as described.

In testimony whereof I affix my signature in presence of two witnesses.

MAX DÉRI.

Witnesses:
HENRY C. CARPENTER,
CHAS. E. CARPENTER.